United States Patent
Williamson et al.

(10) Patent No.: US 9,910,976 B2
(45) Date of Patent: Mar. 6, 2018

(54) PROCESSING MESH COMMUNICATIONS (71) Applicant: Qualcomm Technologies International, Ltd., Cambridge (GB)

(72) Inventors: Paul Nicholas Williamson, Great Cambourne (GB); Nicolas Guy Albert Graube, Barrington (GB); Robin Heydon, Cottenham (GB)

(73) Assignee: QUALCOMM TECHNOLOGIES INTERNATIONAL, LTD., Cambridge (GB)

( * ) Notice: Subject to any disclaimer, the term of this patent is extended or adjusted under 35 U.S.C. 154(b) by 183 days.

(21) Appl. No.: 14/505,399

(22) Filed: Oct. 2, 2014

(65) Prior Publication Data
US 2015/0245220 A1 Aug. 27, 2015

(30) Foreign Application Priority Data

Feb. 25, 2014 (GB) .................................. 1403312.0
Feb. 25, 2014 (GB) .................................. 1403314.6
(Continued)

(51) Int. Cl.
*G06F 21/44* (2013.01)
*H04L 12/26* (2006.01)
(Continued)

(52) U.S. Cl.
CPC ......... *G06F 21/44* (2013.01); *G06Q 10/0833* (2013.01); *H04B 7/14* (2013.01);
(Continued)

(58) Field of Classification Search
None
See application file for complete search history.

(56) References Cited

U.S. PATENT DOCUMENTS 6,917,974 B1 7/2005 Stytz et al.
6,986,046 B1 1/2006 Tuvell et al.
(Continued)

FOREIGN PATENT DOCUMENTS

CN 102761941 A 10/2012
CN 102984798 A 3/2013
(Continued)

OTHER PUBLICATIONS

Search Report for DE Application 10 2014 012 258.1 dated Mar. 2, 2015 (12 pages).
(Continued)

*Primary Examiner* — Chi H Pham
*Assistant Examiner* — Vladislav Agureyev
(74) *Attorney, Agent, or Firm* — Paradice and Li LLP (57) ABSTRACT

A communication device comprising: a first processing function for performing protocol processing of received datagrams; a second processing function for performing protocol processing for received datagrams at a higher level than the first processing function; and a power controller; the device being configured such that the power controller can place the second processing function in a low power state while the first processing function remains capable of performing protocol processing of received datagrams; and the first processing function comprising a mesh datagram processing function configured to process datagrams of a mesh protocol by analyzing received datagrams of the mesh protocol, determining a subset of those datagrams for retransmission, and causing the device to retransmit the determined ones of those datagrams.

18 Claims, 3 Drawing Sheets

(30) Foreign Application Priority Data

| Mar. 31, 2014 | (GB) | ................... | 1405785.5 |
|---|---|---|---|
| Mar. 31, 2014 | (GB) | ................... | 1405786.3 |
| Mar. 31, 2014 | (GB) | ................... | 1405789.7 |
| Mar. 31, 2014 | (GB) | ................... | 1405790.5 |
| Mar. 31, 2014 | (GB) | ................... | 1405791.3 |
| Mar. 31, 2014 | (GB) | ................... | 1405797.0 |
| Jul. 17, 2014 | (GB) | ................... | 1412718.7 |

(51) Int. Cl.

| H04L 12/24 | (2006.01) |
|---|---|
| H04L 9/08 | (2006.01) |
| H04W 76/02 | (2009.01) |
| H04B 7/14 | (2006.01) |
| H04L 12/801 | (2013.01) |
| H04L 12/933 | (2013.01) |
| H04L 29/08 | (2006.01) |
| G06Q 10/08 | (2012.01) |
| H04W 4/02 | (2018.01) |
| H04L 5/00 | (2006.01) |
| H04W 4/06 | (2009.01) |
| H04L 29/06 | (2006.01) |
| H04W 12/04 | (2009.01) |
| H04W 12/06 | (2009.01) |
| H04W 16/18 | (2009.01) |
| H04W 52/38 | (2009.01) |
| H04W 4/00 | (2018.01) |
| H04W 24/06 | (2009.01) |
| H04W 52/02 | (2009.01) |
| H04H 20/71 | (2008.01) |
| H04W 72/12 | (2009.01) |

(52) U.S. Cl.
CPC ........... *H04H 20/71* (2013.01); *H04L 5/0055* (2013.01); *H04L 9/0861* (2013.01); *H04L 41/082* (2013.01); *H04L 41/14* (2013.01); *H04L 43/065* (2013.01); *H04L 43/0852* (2013.01); *H04L 43/0882* (2013.01); *H04L 43/10* (2013.01); *H04L 47/115* (2013.01); *H04L 47/16* (2013.01); *H04L 49/1584* (2013.01); *H04L 63/061* (2013.01); *H04L 63/08* (2013.01); *H04L 63/0853* (2013.01); *H04L 67/30* (2013.01); *H04L 69/22* (2013.01); *H04W 4/008* (2013.01); *H04W 4/028* (2013.01); *H04W 4/06* (2013.01); *H04W 12/04* (2013.01); *H04W 12/06* (2013.01); *H04W 16/18* (2013.01); *H04W 24/06* (2013.01); *H04W 52/0251* (2013.01); *H04W 52/38* (2013.01); *H04W 72/12* (2013.01); *H04W 76/021* (2013.01); *H04W 76/023* (2013.01); *Y02B 60/50* (2013.01)

(56) References Cited

U.S. PATENT DOCUMENTS

| 7,522,540 | B1 | 4/2009 | Maufer |
|---|---|---|---|
| 7,778,270 | B1 | 8/2010 | Zhang et al. |
| 7,787,427 | B1 | 8/2010 | Simon et al. |
| 8,495,618 | B1 | 7/2013 | Inbaraj et al. |
| 8,516,269 | B1 | 8/2013 | Hamlet et al. |
| 8,681,671 | B1 | 3/2014 | Hui et al. |
| 8,938,792 | B2 | 1/2015 | Koeberl et al. |
| 8,953,790 | B2 | 2/2015 | Qi et al. |
| 2002/0119770 | A1 | 8/2002 | Twitchell |
| 2003/0014507 | A1 | 1/2003 | Bertram et al. |
| 2003/0037237 | A1 | 2/2003 | Baldwin et al. |
| 2003/0163554 | A1 | 8/2003 | Sendrowicz |
| 2003/0181203 | A1 | 9/2003 | Cheshire |
| 2004/0246911 | A1 | 12/2004 | Bonsma et al. |
| 2005/0036469 | A1* | 2/2005 | Wentink ............... H04B 7/2126 370/338 |
| 2005/0113102 | A1 | 5/2005 | Kwon et al. |
| 2005/0175184 | A1 | 8/2005 | Grover et al. |
| 2005/0246533 | A1 | 11/2005 | Gentry |
| 2005/0249137 | A1* | 11/2005 | Todd ................ H04W 52/0216 370/311 |
| 2006/0025180 | A1 | 2/2006 | Rajkotia et al. |
| 2006/0034233 | A1 | 2/2006 | Strutt et al. |
| 2006/0041653 | A1 | 2/2006 | Aaron |
| 2006/0135064 | A1 | 6/2006 | Cho et al. |
| 2006/0154598 | A1 | 7/2006 | Rudland et al. |
| 2006/0156390 | A1 | 7/2006 | Baugher |
| 2006/0209584 | A1 | 9/2006 | Devadas et al. |
| 2006/0212938 | A1 | 9/2006 | Suzuki |
| 2006/0245424 | A1 | 11/2006 | Ramanathan et al. |
| 2006/0268742 | A1 | 11/2006 | Chu et al. |
| 2006/0268749 | A1 | 11/2006 | Rahman et al. |
| 2007/0025274 | A1 | 2/2007 | Rahman et al. |
| 2007/0097895 | A1 | 5/2007 | Keshavarzian et al. |
| 2007/0105542 | A1 | 5/2007 | Friedman |
| 2007/0110024 | A1 | 5/2007 | Meier |
| 2007/0127421 | A1 | 6/2007 | D'Amico et al. |
| 2007/0149120 | A1* | 6/2007 | Money ................ H04B 7/1858 455/12.1 |
| 2007/0206537 | A1 | 9/2007 | Cam-Winget et al. |
| 2007/0211654 | A1 | 9/2007 | Kim et al. |
| 2007/0211736 | A1 | 9/2007 | Sapek et al. |
| 2007/0247303 | A1 | 10/2007 | Payton |
| 2007/0280136 | A1 | 12/2007 | Chen et al. |
| 2007/0280137 | A1 | 12/2007 | Bahr et al. |
| 2007/0281721 | A1 | 12/2007 | Lee et al. |
| 2008/0013947 | A1 | 1/2008 | Peloso et al. |
| 2008/0069030 | A1 | 3/2008 | Hirano et al. |
| 2008/0095059 | A1 | 4/2008 | Chu et al. |
| 2008/0205385 | A1* | 8/2008 | Zeng ....................... H04L 45/00 370/389 |
| 2008/0279155 | A1 | 11/2008 | Pratt, Jr. et al. |
| 2008/0291855 | A1 | 11/2008 | Bata et al. |
| 2008/0292105 | A1 | 11/2008 | Wan et al. |
| 2009/0054033 | A1 | 2/2009 | Pratt, Jr. et al. |
| 2009/0067373 | A1 | 3/2009 | Kneckt et al. |
| 2009/0089408 | A1 | 4/2009 | Bou-Diab et al. |
| 2009/0216349 | A1 | 8/2009 | Kwon et al. |
| 2009/0222659 | A1 | 9/2009 | Miyabayashi et al. |
| 2009/0232037 | A1 | 9/2009 | Dixit et al. |
| 2009/0274173 | A1* | 11/2009 | Wentink .................. H04L 69/22 370/474 |
| 2009/0279518 | A1* | 11/2009 | Falk .................. H04L 29/12264 370/338 |
| 2009/0307483 | A1* | 12/2009 | Falk .................... H04L 63/0435 713/153 |
| 2009/0312023 | A1 | 12/2009 | Kazmi |
| 2010/0005294 | A1 | 1/2010 | Kostiainen et al. |
| 2010/0046439 | A1 | 2/2010 | Chen et al. |
| 2010/0061272 | A1* | 3/2010 | Veillette .................. H04L 45/34 370/254 |
| 2010/0100940 | A1 | 4/2010 | Reynolds |
| 2010/0141406 | A1 | 6/2010 | Jo et al. |
| 2010/0149028 | A1 | 6/2010 | Mermet et al. |
| 2010/0191968 | A1 | 7/2010 | Patil et al. |
| 2010/0202345 | A1 | 8/2010 | Jing et al. |
| 2010/0205281 | A1 | 8/2010 | Porter et al. |
| 2010/0208621 | A1 | 8/2010 | Morper |
| 2010/0241857 | A1 | 9/2010 | Okude et al. |
| 2010/0246460 | A1* | 9/2010 | Kholaif ............ H04W 52/0216 370/311 |
| 2010/0260146 | A1 | 10/2010 | Lu |
| 2010/0262828 | A1 | 10/2010 | Brown et al. |
| 2011/0003547 | A1 | 1/2011 | Oh et al. |
| 2011/0053493 | A1 | 3/2011 | Yanagihara |
| 2011/0081860 | A1 | 4/2011 | Brown et al. |
| 2011/0099368 | A1 | 4/2011 | Koh |
| 2011/0121654 | A1 | 5/2011 | Recker et al. |
| 2011/0128884 | A1 | 6/2011 | Reynaud et al. |
| 2011/0149999 | A1 | 6/2011 | Kamito et al. |

(56) References Cited

U.S. PATENT DOCUMENTS

| | | |
|---|---|---|
| 2011/0164512 A1 | 7/2011 | Citrano, III et al. |
| 2011/0216695 A1 | 9/2011 | Orth |
| 2012/0087290 A1 | 4/2012 | Rhee et al. |
| 2012/0087292 A1 | 4/2012 | Grimm et al. |
| 2012/0163292 A1* | 6/2012 | Kneckt ............ H04W 52/0229 370/328 |
| 2012/0182860 A1 | 7/2012 | Liu et al. |
| 2012/0195231 A1 | 8/2012 | Fonseca et al. |
| 2012/0196534 A1 | 8/2012 | Kasslin et al. |
| 2012/0198434 A1 | 8/2012 | Dirstine et al. |
| 2012/0198435 A1 | 8/2012 | Dirstine et al. |
| 2012/0252405 A1 | 10/2012 | Lortz et al. |
| 2012/0263072 A1 | 10/2012 | Wu |
| 2013/0016654 A1 | 1/2013 | Mayo et al. |
| 2013/0029685 A1 | 1/2013 | Moshfeghi |
| 2013/0051552 A1 | 2/2013 | Handschuh et al. |
| 2013/0064175 A1 | 3/2013 | Pandey et al. |
| 2013/0065584 A1 | 3/2013 | Lyon et al. |
| 2013/0067222 A1 | 3/2013 | Munger et al. |
| 2013/0070745 A1 | 3/2013 | Nixon et al. |
| 2013/0080765 A1 | 3/2013 | Mohanty et al. |
| 2013/0107909 A1 | 5/2013 | Jones et al. |
| 2013/0128809 A1* | 5/2013 | Wentink ............ H04L 29/0604 370/328 |
| 2013/0130622 A1 | 5/2013 | Yang et al. |
| 2013/0198305 A1 | 8/2013 | Veillette |
| 2013/0215900 A1 | 8/2013 | Jogadhenu |
| 2013/0219482 A1 | 8/2013 | Brandt |
| 2013/0227336 A1 | 8/2013 | Agarwal et al. |
| 2013/0242929 A1 | 9/2013 | Gorgen et al. |
| 2013/0261821 A1* | 10/2013 | Lu ................ H04L 12/2807 700/289 |
| 2013/0279409 A1 | 10/2013 | Dublin, III et al. |
| 2013/0279410 A1 | 10/2013 | Dublin, III et al. |
| 2013/0301471 A1 | 11/2013 | Brown et al. |
| 2014/0025806 A1 | 1/2014 | Robitaille et al. |
| 2014/0044016 A1 | 2/2014 | Rahman |
| 2014/0047260 A1 | 2/2014 | Iijima |
| 2014/0064261 A1* | 3/2014 | Wang ............ H04W 40/02 370/338 |
| 2014/0089912 A1 | 3/2014 | Wang et al. |
| 2014/0108786 A1 | 4/2014 | Kreft |
| 2014/0111234 A1 | 4/2014 | Laackmann et al. |
| 2014/0112470 A1 | 4/2014 | Shen et al. |
| 2014/0167912 A1 | 6/2014 | Snyder et al. |
| 2014/0169174 A1 | 6/2014 | Gilson |
| 2014/0171062 A1 | 6/2014 | Fallgren et al. |
| 2014/0181172 A1* | 6/2014 | Elliott ............ H04W 28/08 709/201 |
| 2014/0189790 A1 | 7/2014 | Mindler et al. |
| 2014/0266669 A1 | 9/2014 | Fadell et al. |
| 2014/0337607 A1 | 11/2014 | Peterson et al. |
| 2015/0010153 A1 | 1/2015 | Robertson |
| 2015/0019892 A1* | 1/2015 | Agrawal ............ G06F 1/32 713/323 |
| 2015/0052351 A1 | 2/2015 | Nodehi et al. |
| 2015/0058409 A1 | 2/2015 | Wang |
| 2015/0121108 A1* | 4/2015 | Agrawal ............ G06F 1/3206 713/323 |
| 2015/0143130 A1 | 5/2015 | Ducharme et al. |
| 2015/0195692 A1 | 7/2015 | Chow et al. |
| 2015/0242614 A1 | 8/2015 | Scagnol et al. |
| 2015/0244481 A1 | 8/2015 | Tyson et al. |
| 2015/0244484 A1 | 8/2015 | Tyson et al. |
| 2015/0244565 A1 | 8/2015 | Heydon et al. |
| 2015/0244623 A1 | 8/2015 | Heydon et al. |
| 2015/0244648 A1 | 8/2015 | Tyson et al. |
| 2015/0244828 A1 | 8/2015 | Heydon |
| 2015/0245179 A1 | 8/2015 | Jarvis et al. |
| 2015/0245182 A1 | 8/2015 | Scagnol et al. |
| 2015/0245203 A1 | 8/2015 | Tyson et al. |
| 2015/0245204 A1 | 8/2015 | Heydon |
| 2015/0245231 A1 | 8/2015 | Jarvis et al. |
| 2015/0245296 A1 | 8/2015 | Tyson et al. |
| 2015/0245351 A1 | 8/2015 | Banerjea et al. |
| 2015/0245369 A1 | 8/2015 | Heydon |
| 2015/0245412 A1 | 8/2015 | Tyson et al. |
| 2015/0326444 A1 | 11/2015 | Smith et al. |
| 2015/0351014 A1 | 12/2015 | Jung et al. |
| 2017/0250749 A1* | 8/2017 | Mazzarella ........ H04B 7/18504 |

FOREIGN PATENT DOCUMENTS

| | | |
|---|---|---|
| EP | 1496668 A1 | 1/2005 |
| EP | 1780951 A2 | 5/2007 |
| EP | 1886450 B1 | 2/2008 |
| EP | 2306692 A1 | 1/2011 |
| GB | 2464125 A | 4/2010 |
| JP | 2007124148 A | 5/2007 |
| WO | 02078272 A1 | 10/2002 |
| WO | 03026224 A1 | 3/2003 |
| WO | 2004004230 A1 | 1/2004 |
| WO | WO-2004104850 A1 | 12/2004 |
| WO | 2007013914 A1 | 2/2007 |
| WO | 2008004102 A2 | 1/2008 |
| WO | 2008013878 A1 | 1/2008 |
| WO | 2009082151 A2 | 7/2009 |
| WO | 2009088887 A2 | 7/2009 |
| WO | 2010036885 A2 | 4/2010 |
| WO | 2010/089737 A1 | 8/2010 |
| WO | 2011043755 A1 | 4/2011 |
| WO | 2013010427 A | 1/2012 |
| WO | 2012064178 A1 | 5/2012 |
| WO | 2013028404 A1 | 2/2013 |
| WO | 2013057666 A1 | 4/2013 |
| WO | 2014/000163 A1 | 1/2014 |
| WO | WO 2014105893 A1 * | 7/2014 ............ H04W 12/08 |

OTHER PUBLICATIONS

Search Report for DE Application 10 2014 012 518.1 dated Feb. 27, 2015 (14 pages).

Search Report for DE Application 10 2014 012 615.3 dated Jan. 27, 2015 (6 pages).

Search Report for GB Application 1405790.5 dated Oct. 14, 2014 (5 pages).

Search Report for GB Application 1403312.0 dated Jun. 25, 2014 (3 pages).

Search Report for GB Application 1405786.3 dated Jul. 17, 2014 (3 pages).

Search Report for GB Application 1415178.1 dated Sep. 25, 2014 (5 pages).

Search Report for GB Application 1405797.0 dated Sep. 2, 2014 (3 pages).

Search Report for GB Application 1405789.7 dated Sep. 26, 2014 (4 pages).

Search Report for GB Application 1405797.0 dated Jul. 17, 2014 (4 pages).

Search Report for GB Application 1415177.3 dated Sep. 10, 2014 (4 pages).

Search Report for DE Application 10 2014 012 257.3 dated Jan. 27, 2015 (7 pages).

Search Report for DE Application 10 2014 012 616.1 dated Feb. 3, 2015 (6 pages).

Search Report for GB Application 1412715.3 dated Jan. 8, 2015 (3 pages).

Search Report for GB Application 1412722.9 dated Jan. 13, 2015 (6 pages).

Search Report for GB Application 1501943.3 dated Mar. 20, 2015 (4 pages).

Schutz K: "Trusted Platforms for Homeland Security", Atmel white paper, Copyright 2004, pp. 1-8, http://www.atmel.com/images/doc5062.pdf.

Chiang et al., "Neighborhood-Aware Density Control in Wireless Sensor Networks," 2008 IEEE International Conferences on Sensor Networks, Ubiquitous, and Trustworthy Computing. 8 pages.

(56) References Cited

OTHER PUBLICATIONS

Balachandran et al., "Adaptive Sleeping and Awakening Protocol (ASAP) for Energy Efficient Adhoc Sensor Networks," 2005 IEEE, 7 pages.

* cited by examiner

PROCESSING MESH COMMUNICATIONS

CROSS REFERENCE TO RELATED APPLICATIONS

This non-provisional patent application claims priority to Great Britain applications: GB 1412718.7, filed Jul. 17, 2014; GB 1405790.5, filed Mar. 31, 2014; GB 1403314.6, filed Feb. 25, 2014; GB 1405785.5, filed Mar. 31, 2014; GB 1405786.3, filed Mar. 31, 2014; GB 1405789.7, filed Mar. 31, 2014; GB 1403312.0, filed Feb. 25, 2014; GB 1405791.3, filed Mar. 31, 2014; GB 1405797.0, filed Mar. 31, 2014.

TECHNICAL FIELD

This invention relates to processing messages received over a mesh network.

BACKGROUND

Figure 1:
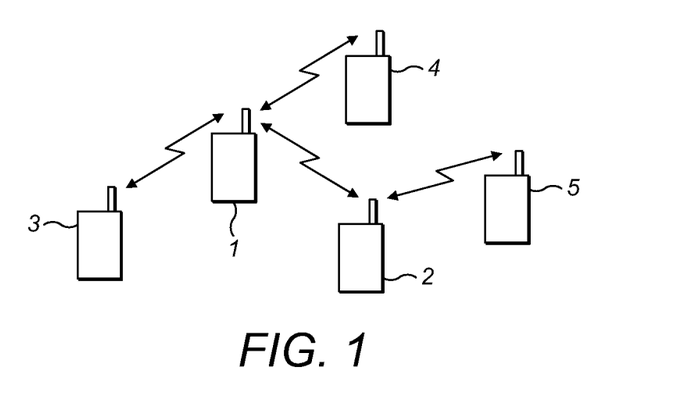
FIG. 1 illustrates a mesh network.

FIG. 1 shows a set of devices 1 to 5 cooperating in a mesh network. In a mesh network each device typically has the capacity to communicate directly with multiple peer devices, without the need to go via an intermediate base station or switch. That can be done using broadcast messages which can be received and actioned by any nearby device, or by messages that are specifically addressed to one or more devices. For example, device 1 can communicate directly with any of devices 2, 3 and 4. Another feature of this mesh network is that devices can serve to forward messages between other members of the network that cannot communicate directly with each other. For example, device 1 can communicate directly with device 2 but not with device 5. Device 2 can communicate directly with device 5. When device 1 wants to send a message to device 5 it can do so by transmitting a message which device 2 then relays onwards to device 5.

It has been proposed that devices may be configured so as to automatically join a mesh network of the type described above when they are in range of other such devices. This may be of particular interest in the field of low powered devices. Emerging protocols such as Bluetooth Low Energy mean that devices capable of wireless communication can be powered for a number of years from a simple battery without the need for recharging. The low cost of these devices, together with the prospect of them having at least as long a lifetime as some common consumer goods, opens up the possibility that the devices could be implanted in a wide range of articles that might be found in a domestic or industrial setting, or that might be carried by a person. Examples include mobile phones, light bulbs, wallets, desks, shopping bags, articles of clothing and door keys. Some of these items may be expected to be static. Others may be moved around. It can be imagined that whatever low power devices happen to be together in one place could adventitiously cooperate to form a mesh transport network. That transport network could relay communications between devices that cannot communicate directly, without someone having to specifically provide underlying infrastructure for the network.

The value of this proposal derives from the possibility that the low cost, low power and long lifetime of the devices can mean that they are so widely distributed that the transport network has a good chance of coming into existence wherever it is needed. However, if the devices devote energy to supporting mesh networks their energy may be depleted and their lifetime may fall. If a network of this type is to be widely adopted it should reach a successful balance between on the one hand devices' propensity to cooperate in networks and on the other hand the devices' lifetimes.

One way to reduce the power consumed by devices cooperating in a mesh network may be to enable them to filter the mesh messages that they process, whilst still relaying them when appropriate. For example, each mesh message could contain a field that indicates some characteristic of the message such as its source, destination or urgency, and a device could decide whether to forward the message based on that field or based on whether the message matches a network key of the node. However, this may not straightforward, because the filtering could itself increase power consumption. Furthermore, in many low power devices receiving signals can use more energy than transmitting signals.

Communication protocols may be implemented using a protocol stack. Protocol stacks are often aligned with the OSI (open systems interconnection) model, in which protocol functions are distributed hierarchically between successive layers in the stack. It may be possible to reconfigure the stack so as to move a function from a higher layer into a lower layer for the purpose of increasing speed or saving power. However, this is generally done for the purpose of directly benefiting the communication needs of the device that has the reconfigured stack.

There is a need for a way of configuring devices so as to increase the potential coverage of adventitious mesh networks.

SUMMARY OF THE INVENTION

According to one aspect of the present invention there is provided a communication device comprising: a first processing function for performing protocol processing of received datagrams; a second processing function for performing protocol processing for received datagrams at a higher level than the first processing function; and a power controller; the device being configured such that the power controller can place the second processing function in a low power state whilst the first processing function remains capable of performing protocol processing of received datagrams; and the first processing function comprising a mesh datagram processing function configured to process datagrams of a mesh protocol by analysing received datagrams of the mesh protocol, determining a subset of those datagrams for retransmission, and causing the device to retransmit the determined ones of those datagrams.

According to a second aspect of the present invention there is provided a method for processing received datagrams of a mesh protocol by means of a communication device comprising a first processing function for performing protocol processing of received datagrams, a second processing function for performing protocol processing for received datagrams at a higher level than the first processing function, and a power controller, the device being configured such that the power controller can place the second processing function in a low power state whilst the first processing function remains capable of performing protocol processing of received datagrams; the method comprising, at the first processing function, analysing received datagrams of the mesh protocol, determining a subset of those datagrams for retransmission, and causing the device to retransmit the determined ones of those datagrams.

The first processing function may be configured for demodulating received signals representing the datagram.

Those may be signals received by the device in radio frequency and/or wireless form. The device may include apparatus for downconverting those signals to baseband.

The first processing function may be configured for performing one or both of error correction and error checking on received signals representing received datagrams.

The first processing function may implement at least part of a protocol physical layer and/or a protocol data link layer. The first processing function may implement the lowest layers of the logical protocol processing performed by the device on received signals, e.g. received mesh signals.

The datagrams may be Bluetooth datagrams. The first processing function may implement a Bluetooth link layer.

The second processing function may be configured for implementing a protocol application layer.

The communication device may be divided into power domains that are each independently controllable for power consumption by the power controller. The first processing function and the second processing function may be in different power domains.

The first processing function may be capable of performing protocol processing of datagrams being transmitted. The mesh datagram processing function may be configured to cause the first processing function to retransmit selected ones of the mesh datagrams.

The mesh datagram processing function may be configured to process received datagrams by comparing each one with predetermined criteria characterising datagrams of the mesh protocol so as to determine whether a received datagram is a datagram of the mesh protocol.

The mesh datagram processing function may be configured to process received datagrams of the mesh protocol in accordance with a security function in order to determine whether each one relates to a sub-network of the mesh protocol of which the communication device is a member. The communication device may store a key of the sub-network. The mesh datagram processing function may be configured to process each received datagram of the mesh protocol in accordance with the security function by (i) computing the value of the security function taking as operands the stored key and at least part of the respective datagram and (ii) comparing the computed value of the security function with a part of the respective datagram. The mesh datagram processing function may be configured to determine whether to retransmit the respective datagram in dependence on the result of that comparison.

The mesh datagram processing function may be configured to determine whether a received datagram of the mesh protocol should be actioned by the device, and if so to pass the datagram to the second processing function.

The communication device may store an address in the mesh network. The mesh datagram processing function may be configured to process each received datagram of the mesh protocol in accordance with the security function by comparing a part of the respective datagram with the address. The mesh datagram processing function may be configured to determine whether the respective datagram should be actioned by the device in dependence on the result of that comparison.

The mesh protocol may define a field in datagrams of the mesh protocol for restricting the number of times they can be retransmitted. The mesh datagram processing function may be configured to check whether a field (specifically that field) of each received datagram of the mesh protocol is at or beyond a predetermined threshold, and if that field is at or beyond the threshold to not determine to cause the device to retransmit the respective datagram; and on causing the device to retransmit a datagram, to cause it to retransmit the datagram with the said field altered to have a value that is between (i) the threshold and (ii) the value of the field in the datagram as received by the device. For example, the threshold is zero. The alteration may reduce the value of that field, e.g. by one.

The second processing function may be capable of performing the same functions for processing datagrams of the mesh protocol as the mesh processing function. In that way received datagrams can be processed in respect of the mesh protocol by the mesh processing function or the second processing function. The first processing function may be capable of operating in a first mode in which received datagrams of the mesh protocol can be caused to be retransmitted by the mesh processing function, and a second mode in which received datagrams of the mesh protocol can not be caused to be retransmitted by the mesh processing function but are passed to the second processing function.

The device may be configured such that the power controller can place the second processing function in a high power state.

The device may be capable of communicating using datagrams other than of the mesh protocol. The device may be configured such that received datagrams other than of the mesh protocol can be passed from the first processing function to the second processing function independently of the mesh processing function.

The step of determining a subset of those datagrams for retransmission may comprises determining whether each received datagram of the mesh protocol matches a list of previously received datagrams, and if so not retransmitting it; and/or determining whether each received datagram of the mesh protocol relates to a sub-network of the mesh to which the device belongs, and if so determining whether to retransmit it in dependence on pre-stored criteria held by the device. One or both of the list of previously received datagrams and the said pre-stored criteria may be stored in the first processing function.

The first processing function may be configured to perform all the filtering functions according to which the device may determine to retransmit or to not retransmit a datagram in order to implement the mesh protocol. Those filtering functions may include any one or more of the following functions: "previous encounter" (i.e. deciding whether to retransmit the packet in dependence on whether the datagram has previously been received by the device), "network membership" (i.e. deciding whether to retransmit the datagram in dependence on whether the datagram pertains to a sub-network of the mesh of which the device is a part), "destination discovery" (i.e. deciding whether to retransmit the datagram in dependence on its destination address). There may be additional filtering mechanisms. For example, the device may determine whether to retransmit the packet in dependence on any one or more of: the signal strength with which the datagram was received, the error content of the datagram as received (e.g. as indicated by the amount of error correction performed on the datagram as received), the power reserve of the device and the type of the device.

According to a third aspect of the present invention there is provided a communication device for operating in a mesh network, the communication device being configured to process received datagrams of the mesh protocol so as to, in respect of a specific received datagram, (a) determine whether to retransmit that datagram and (b) determine whether to action that datagram; the communication device being configured to apply criteria to those determinations such that a datagram can be retransmitted by the communication device independently of whether it is actioned by the communication device.

The criteria may be are such that the communication device can determine not to forward a datagram, and to action that datagram.

The device may be associated with an appliance supplementary to its wireless communication function, and may be configured to, on determining to action a datagram, signal the appliance to perform a function indicated by the datagram.

The present invention will now be described by way of example with reference to the accompanying drawings. In the drawings:

DETAILED DESCRIPTION

In order to implement a network of the type shown in FIG. 1, devices in the network may receive datagrams (e.g. packets), and when appropriate retransmit them so they can be received by other devices. In order to reduce energy consumption and prevent datagrams being forwarded indefinitely, logic can advantageously be applied when a device receives a datagram in order to determine whether the datagram is to be retransmitted and/or actioned by the device or an appliance associated with it so as to perform some function beyond simply serving the mesh network. In the devices to be described below, that processing may be done at layer 1 or layer 2 in accordance with the OSI model. That means that the mesh network can be supported by a device without it having to power up higher processing layers. As will be discussed below, each layer of protocol processing may be done in software or in dedicated hardware or in a combination of the two.

Figure 2:
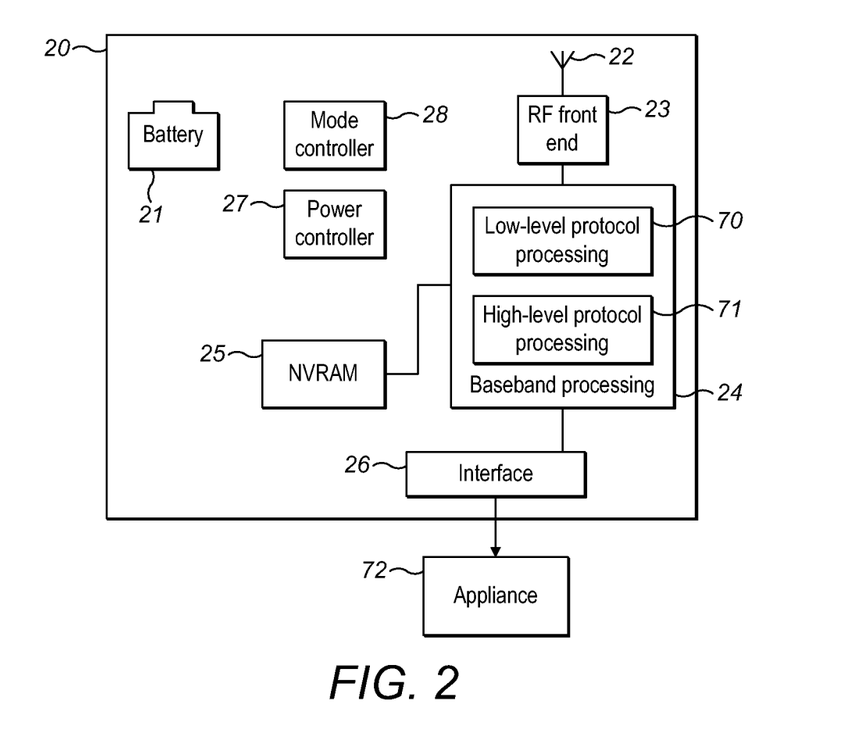
FIG. 2 illustrates the hardware of a communication device and an associated appliance.

FIG. 2 illustrates one potential design for the hardware of a communication device. The communication device 20 comprises a battery 21, an antenna 22, a radio frequency front end 23, a baseband processor 24, a non-volatile memory 25 and a data interface 26. In this example the baseband processor 24 is subdivided into two separate hardware sections: a low-layer processing unit 70 and a microprocessor 71 which is configured to execute code to perform higher layer processing.

The battery 21 powers the other components. Alternatively, power could be received through the data interface 26, which could use the USB (universal serial bus) protocol.

The RF front end 23 communicates with the antenna 22 for transmitting and receiving wireless radio frequency signals. Signals received by the RF front end are converted to baseband and passed to the baseband processor 24 for further processing. Signals generated for transmission by the baseband processor are passed to the RF front end for conversion to radio frequency and transmission.

The baseband processor comprises the low-layer processing unit 70 and microprocessor 71. The low-layer processing device 70 is a section of hardware separate from the microprocessor which implements low-level functions of a protocol stack. The microprocessor 71 is configured to execute program code that is stored in non-transient form in memory 25. The code causes the processor to execute the functions needed to identify received signals and action them to implement a mesh network of the type described with reference to FIG. 1, and to generate signals for transmission to implement the same network. The low-layer processing device may be implemented exclusively as hardware logic. Instead or in addition it may include logic for executing program code, which could be stored as non-transient data in memory 25. Instead of, or in addition to executing software code, the microprocessor 71 may have dedicated hardware that performs some or all of its baseband functions. In either or both of the low-layer processing unit 70 and the microprocessor 71 dedicated hardware may permit some functions, such as encryption, to be performed more quickly or with less power usage. As indicated above, the baseband processing unit 24 may have more than one processor. For example, a lower level of a protocol stack may be implemented by one processor, or part of a processor, and an upper level of a protocol stack may be implemented by another processor, or part of a processor. The low-level unit 70 and the higher level unit 71 may be part of separate power domains, so that the higher level unit can be set in a low-power state when the low-level unit is fully operational.

The interface 26 allows the device to receive digital data that can be transmitted, or to communicate with other entities, for instance, with a sensor which could provide readings that could be interpreted by the processor to generate other data for onward transmission. For example, the interface 26 could receive status data such as fault codes from a burglar alarm, data from a light switch representing its state (on or off) or data in analog or digital form from a temperature sensor.

In order to reduce the power consumed by the device, the device includes a power controller 27. The power controller could be a stand-alone component, as illustrated in FIG. 2, or could be integrated into the processor 24. The power controller controls the power supplied to various components of the device. For example, it could power down the RF front end 23, the interface 26 or components of the processor 24 when they are not in use. At least some of the processing elements for implementing a lower protocol layer may be in a different power domain from those for implementing a lower protocol layer, so that the function represented by the higher layer can be placed in a low power state whilst the lower layer remains substantially fully operational.

28 is a mode controller which will be discussed in more detail below.

Figure 3:
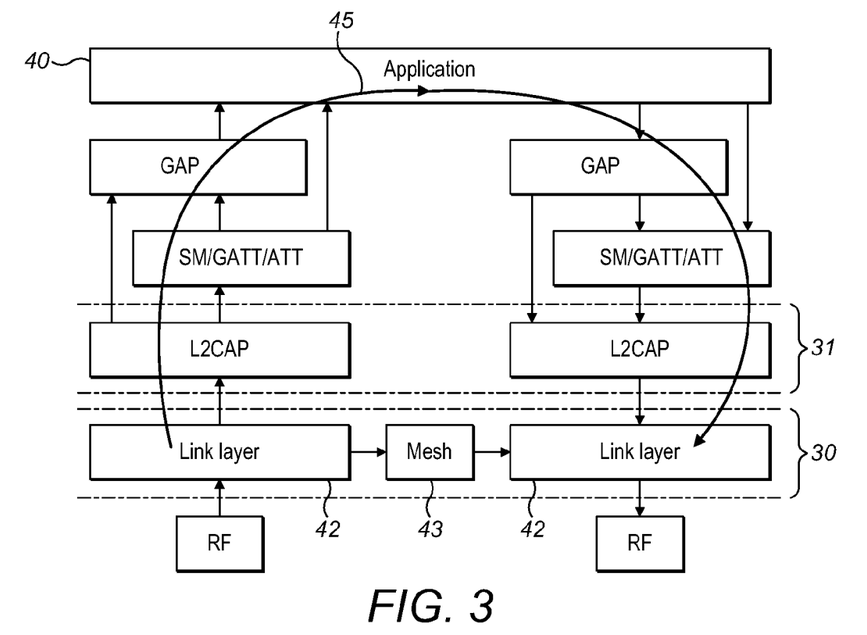
FIG. 3 shows the protocol stack implemented in a communication device.

FIG. 3 shows the protocol stack implemented by the baseband processor 24. The stack is implemented in accordance with program code stored in the memory 25 and/or by dedicated hardware in the baseband processor. The protocol stack is arranged as a series of layers. In normal operation for reception each layer of the stack is invoked in turn to process an element of received data. Thus, the data is processed first by the lowest layer 30, which yields an intermediate result. Then that intermediate result is processed by the next layer 31, which yields another intermediate result, and so on until the data reaches the application layer, 40. This staged processing can be done by the processor invoking respective components of the software code and/or dedicated hardware elements in turn.

The application layer is configured so it can perform the functions needed to implement the logic underpinning the mesh network: for instance deciding to originate, retransmit or act upon mesh network messages. In normal operation for reception the same steps are reversed. A message generated at the application layer is processed by the other layers in turn, ending with the lowest layer 30. The data generated by layer 30 is passed to the RF front end for transmission.

In FIG. 3 the transmit and receive paths are separated, to illustrate the logical flow of communications. However, in practice each layer may be implemented by a common set of hardware and/or software components for both transmit and receive.

The details of the protocol stack may vary depending on the protocol that is in use. Stacks to which the present invention is applicable can have a layer that performs functions of layer 1 and/or 2 in the OSI model and a layer that performs functions of a higher layer, e.g., the application layer. Layer 1 in the OSI model is the physical layer. It defines the protocol for the provision of a connection that may not be reliable between two directly connected nodes, and the modulation or conversion between the representation of digital data in user equipment and the corresponding signals transmitted over the physical communications channel, which in this example is a wireless radio link. Layer 2 is the data link layer. The data link layer provides a reliable link between two directly connected nodes, by detecting and if necessary correcting errors that may occur in the physical layer. Layer 2 may be absent in a mesh network since reliable communication might not be available. FIG. 3 illustrates the example of a Bluetooth Low Energy (BTLE) protocol stack. In this example functions of the physical and data link layers of the OSI model are implemented by the "link layer" 30. In BTLE the link layer manages the sequence and timing of signals that are transmitted, and can negotiate with other devices to establish connection parameters and to implement data flow control. The link layer also handles signals received and transmitted while the device is in advertising or scan modes. The link layer does not provide for reliable communications. For example it is not capable of requesting retransmission or providing acknowledgements.

Of particular interest is a mesh protocol of the type described in the applicant's co-pending UK application number 1405785.5, the contents of which are incorporated herein by reference. In such a protocol, devices can be configured to participate in a specific mesh sub-network by storing a data string that acts as a key for that sub-network.

Figure 4:
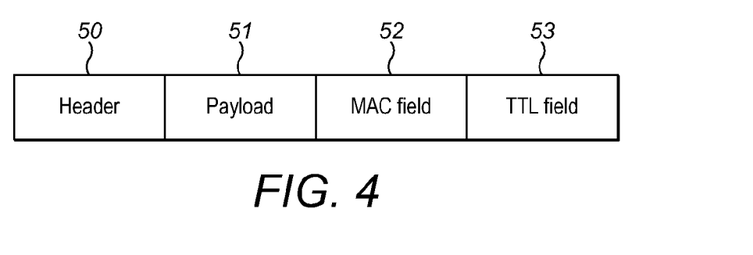
FIG. 4 illustrates the structure of a mesh packet.

FIG. 4 shows the structure of packets in the mesh network. Each packet comprises a header 50, a payload 51, a MAC field 52 for network partition and a time-to-live (TTL) field 53. The header includes data identifying the address of the originator of the packet and, if the packet is not a broadcast packet, data identifying the device(s) that is/are to act on the packet. The header may also include a packet serial number given by the originating device, and assigned so that the combination of the address of the originating device and the serial number are substantially unique. This allows the header to characterise the message, allowing a receiving device to avoid retransmitting the same message twice, as will be described in more detail below. The payload includes information for the device(s) that is/are to act on the packet. The payload may be encrypted. The MAC field 52 allows devices that receive the packet to determine which sub-network(s) the packet relate(s) to. The TTL field is used as a counter to prevent endless retransmission of the packet.

The MAC field operates to partition the mesh network. When the packet is originated, the MAC field is generated as a secure function of the header, the payload and the key of the sub-network to which the packet relates. The function may be a one-way function, for instance a cryptographic hash function such as HMAC-SHA256 or a cipher block chaining MAC such as AES-128 CBC-MAC. At a recipient device, the MAC can be tested by repeating the same function using the received header and payload together with each key the device stores, in turn. If the function performed at the recipient yields the same value as the received MAC then the packet can be determined to belong to the sub-network to which that key relates. As will be described below, a device can be configured to respond to all mesh packets, or only those that are identified in accordance with one or more keys. There may be multiple values stored in the MAC field, allowing a packet to belong to multiple sub-networks.

Figure 5:
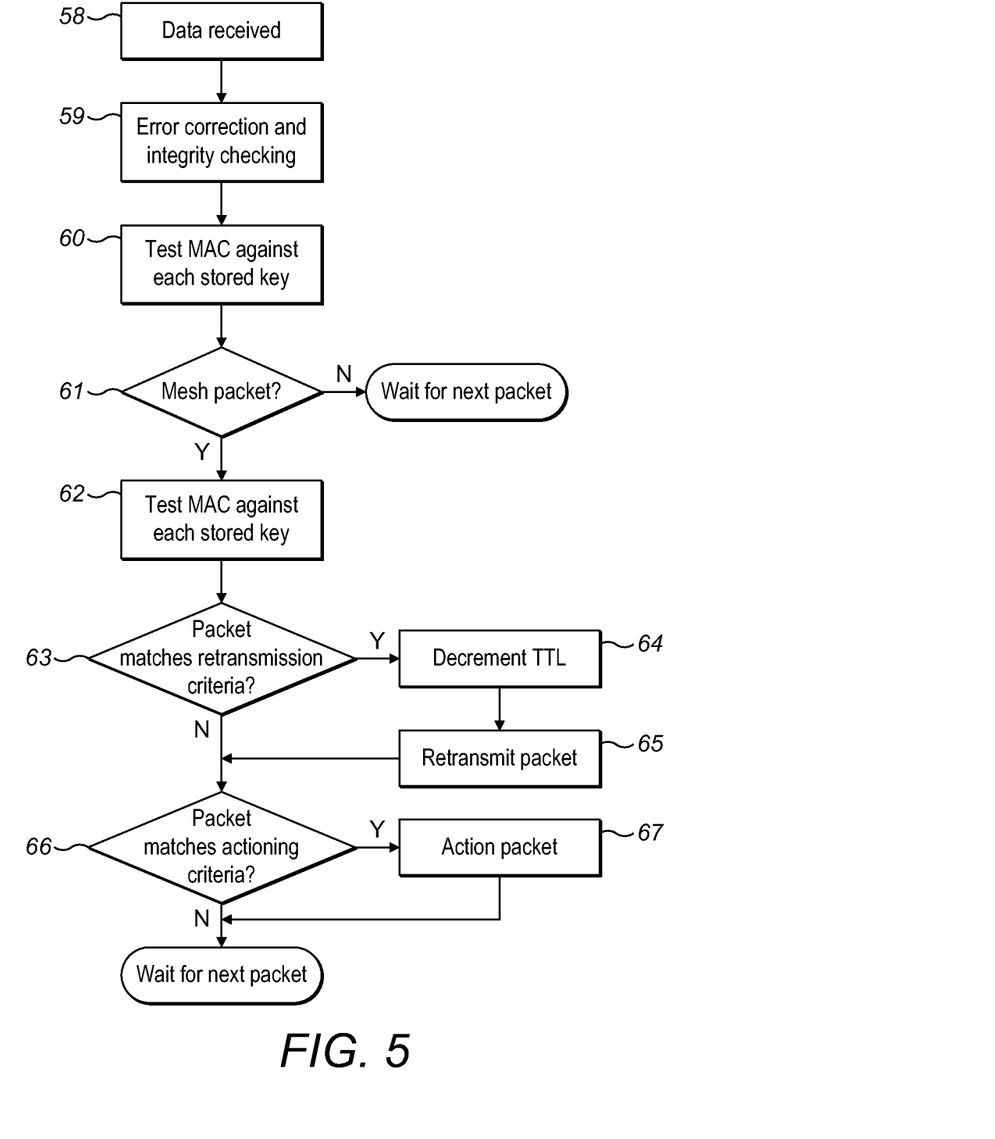
FIG. 5 is a flow diagram for the processing of received mesh packets.

Each device in the mesh network listens for mesh packets. The duty cycle with which it listens can be determined in dependence on the availability of power at the device. For example, mains-powered devices could listen constantly, whereas battery-powered devices could listen intermittently. FIG. 5 illustrates the way in which the device processes received packets. On receiving data that may constitute a mesh packet (step 58) a device performs certain low-level functions (step 59), such as error correction and integrity checking (e.g. with a CRC (cyclic redundancy check) or hash) to verify that the packet has been successfully received. These functions are conventionally performed at layer 1 or 2 of the OSI model—that is in layer 30 of the protocol stack illustrated in FIG. 3. They may be performed in either the main processing function for layers 1 and 2 (block 42) or in the mesh function 43. For example, these functions are performed in the main layer 1 or layer 2 processing function, as with any other received packet.

If the packet is found to meet the integrity requirements it is tested to determine whether it meets the criteria for a mesh packet. (Steps 60 and 61). This may be done by the mesh function 43.

If the packet has the form of a mesh packet, it is then tested (step 62) against the or each key stored by the device in turn, by implementing a predetermined function taking as its operands the packet header and payload and the respective key. If the output of the function equals the value received in the MAC field of the packet then the packet is deemed to belong to the sub-network to which the respective key belongs. This step yields a list of the sub-networks (if any) whose keys are known to the device and to which the packet relates.

Next the packet is tested against a set of pre-stored criteria to determine whether it should be retransmitted. (Step 63). The criteria are pre-stored in the device, for example in memory 25. The criteria may depend on one or more of the functions the device is intended to perform, the energy available to the device, the device's location and any other operational parameters. Examples of usable criteria include:

Packets may be retransmitted only if they match certain network keys. Alternatively, the device could retransmit all mesh packets it receives.

Packets could be retransmitted only if the device has greater than a certain amount of energy available to it: for example if its battery has a voltage above a predetermined threshold.

Packets could be retransmitted only if they are received with an RSSI above a predetermined threshold. Filtering of this nature could be performed in the low-level processing section 70; or even in the RF receive chain 23, which could save more power.

Packets could be retransmitted only if their header or payload matches certain predetermined criteria.

Any or all of multiple such criteria could be combined using AND and OR operators. A criterion is also that the TTL of the packet is greater than a predetermined limit, conveniently zero. This avoids the packet being retransmitted indefinitely. If a packet meets the criteria for retransmission then the device decrements its TTL by one (step 64) and retransmits it (step 65).

Next the packet is tested against a set of pre-stored criteria to determine whether it should be actioned. (Step 66). The criteria are pre-stored in the device, for example in memory 25. The criteria may depend on one or more of the functions the device is intended to perform, the energy available to the device, the device's location and any other operational parameters. Examples of usable criteria include:

Packets may be actioned only if they match certain network keys. This can provide security for the device or items controlled by the device.

Packets could be actioned only if their header or payload matches certain predetermined criteria: for example that the address of the device is given as a destination address in the header.

Any or all of multiple such criteria could be combined using AND and OR operators. If a packet meets the criteria for retransmission then the device actions it. (Step 67). Memory 25 may store code that permits the processor to interpret and act on the payload. This may involve decrypting the payload. The action specified by the payload may, for example, be that the processor enters a certain state or transmits certain data from interface 26. For example, the device could serve to control a light bulb. When an appropriate mesh packet is received it could be actioned with the result that a signal is sent from the interface 26 to turn the light bulb on.

In one design of the communications device, steps 62, 63 and 64, together with the step of forming the packet for retransmission and passing it to the transmit protocol stack for retransmission, can be performed at the application layer 40 in FIG. 4. This approach requires all received mesh packets to be passed up to the application layer, and packets for retransmission to be passed back down through the protocol stack, as illustrated at 45. This requires a certain amount of protocol processing, which consumes energy. To avoid, this, the link layer 42 is associated with a mesh function 43. The mesh function may be incorporated in the link layer, but more generally it is part of a common power domain with the link layer so that other parts of the device may be powered down whilst the link layer and the mesh function remain active.

The mesh function is configured to implement certain aspects of the logic needed to allow the mesh network to function.

First, the mesh function 43 can test the incoming packet to establish that it is a mesh packet. Mesh packets may be characterised by a certain type value in a portion of the header, by their length, or by the presence of a value elsewhere in the packet. In general, the mesh function may be capable of assessing whether the content of the packet matches certain predetermined criteria that are indicative of mesh packets. If the packet matches the criteria then the packet is processed further by the mesh function. Otherwise, the packet is passed by the mesh function for processing by the remainder of the link layer.

Second, the mesh function 43 can test the incoming packet to establish whether it belongs to one or more mesh networks of which the device is a member. This implements step 62 of FIG. 6. As described above, this may be done by:

(a) implementing a predetermined function taking as its operands (i) part or all of the received packet and (ii) a key that is stored by the device;

(b) comparing the result of that function with a field in the received packet (e.g. the MAC field 52) to determine whether they match; and (c) if there is a match (e.g. if the result and the field are equal) determining the packet to belong to the network to which the respective key relates.

The key may correspond to a mesh network and the fact of the device storing the key may, in effect, make the device a member of that network. The device may store one or more keys. The key(s) may be stored in non-volatile memory (e.g. memory 25) to which the mesh unit 43 has access.

Third, the mesh function can determine whether the incoming packet matches the retransmission criteria. This may be done by the device storing in non-volatile memory (e.g. memory 25) a set of data that represents the retransmission criteria and the mesh function applying those criteria against the received packet. The following table indicates one way in which that can be done. A packet is deemed to meet the retransmission criteria if it matches any row of the table.

| Network key | Payload type | Minimum energy threshold |
|---|---|---|
| A | Any | 0.0 V |
| B | 1 | 0.0 V |
| B | 2 | 3.1 V |
| Any | Any | 3.5 V |

In this example the first column of the table indicates which network key, if any, the packet must match. The second column of the table indicates whether the type of the packet's payload (as determined according to a predetermined schema) must match a certain type. The third column of the table indicates the minimum voltage of the device's battery at which the row can be matched. So in this example, a packet matching network key A and being of any type is to be retransmitted for any battery voltage; a packet matching network key B is to be retransmitted if it is of type 1 for any battery voltage, or if it is of type 2 and the battery voltage is above 3.1V; and a packet of any other network key and any type is to be retransmitted for any battery voltage above 3.5V. Naturally, other criteria could be used, and the data could be presented in a different manner. The stored criteria are available to the mesh function 43 to enable it to perform step 63 for incoming packets. The mesh unit also checks that the TTL field of the packet is not at the limit at which it will not be retransmitted (e.g. zero). It may additionally check that the packet is not one that the device has processed before. To do this it may store the header of each received packet in a buffer (e.g. in memory 26 or in memory located in the low-level hardware 70) and check that the newly received packet does not match a previously stored header. If the header is formed so as to substantially uniquely identify a message, for example by including the address of the originating device and a serial number allocated by that device, this process can avoid the device retransmitting a packet more than once. If the TTL field is at the limit, or if the packet has been received before, it is not retransmitted. It should be noted that if the list of received packets is stored in memory located in low-level hardware 70 then that can avoid the need to power up memory 26 when the device is simply processing received mesh packets. The list could be restricted in size: for example to the last 256 received mesh packets.

Fourth, the mesh function can, if a packet is to be retransmitted, form the packet for retransmission and cause it to be retransmitted. The packet for retransmission is identical to the received packet, except with its TTL field decremented by one. In other protocols, other changes could be made. The TTL field could be interpreted in other ways: for example it could be incremented up to a threshold, and could be incremented or decremented by other amounts. Once the packet has been formed for retransmission it is passed by the mesh function to the transmit part of the link layer, bypassing the upper layers.

Fifth, the mesh function can determine whether the incoming packet matches the action criteria. This may be done by the device storing in non-volatile memory (e.g. memory 26) a set of data that represents the action criteria and applying those criteria against the received packet. The following table indicates one way in which that can be done. A packet is deemed to meet the action criteria if it matches any row of the table.

| Network key | Device address match required |
|---|---|
| A | Yes |
| B | Yes |
| C | No |

In this example the first column of the table indicates which network key, if any, the packet must match. The second column of the table indicates whether the destination address of the packet must match the address of the device. So in this example, a packet matching network key A or B is to be actioned if it matches the device's own address; and a packet matching network key C is to be actioned whether or not it matches the device's own address. Naturally, other criteria could be used, and the data could be presented in a different manner. The stored criteria are available to the mesh function 43 to enable it to perform step 66 for incoming packets. The mesh unit also checks that the packet is not one that the device has processed before. This may be done in the manner described previously. If a packet is to be actioned, it can be passed through the stack to the application layer.

As indicated above, there may be different criteria for re-transmitting and for actioning a packet, with the effect that at one device: (i) some packets may be actioned but not re-transmitted, (ii) other packets may be re-transmitted but not actioned, (iii) other packets may be both re-transmitted and actioned and (iv) other packets may be both actioned and re-transmitted. For example, a device may re-transmit all packets but action only packets that pertain to it or to a sub-network of which the device is part. Or a device may action any packets that pertain to it or to a sub-network of which it is part, but only re-transmit a random subset of the packets it receives.

The packets may be actioned in one of two ways. First, they may be actioned internally by the communication device. The content of the packet's payload may designate that the packet is to cause a change of state of the communication device: for example to enter a more or less aggressive power-saving mode or to change its operating frequencies or times. When the packet is passed to the device's application layer it processes the packet to analyse its payload. If the payload—either as received or after processing such as decryption—matches a predetermined format that indicates the change of state is to take place then the device implements that. Second, the device may be attached to, incorporated in or communicatively coupled with an appliance. (Illustrated at 72 in FIG. 2). The content of the packet's payload may designate that the packet is to cause a change of state of the associated appliance 72. For example, the appliance may be a light bulb and the packet may indicate that the bulb is to switch on or off. When the packet is passed to the device's application layer it processes the packet to analyse its payload. If the payload—either as received or after processing such as decryption—matches a predetermined format that indicates the change of state of the associated appliance is to take place then the device implements that by signalling the associated appliance accordingly using the interface 26.

The mesh function has two modes of operation: an intercept mode, in which it intercepts mesh packets and processes them in the manner described above at the link layer and a debug mode in which it permits all mesh packets to pass upwards through the stack. The operating mode of the mesh function can be commanded by a control function 28 of the device. This dual-mode approach is particularly useful when the mesh function is implemented in hardware, rather than software, since it allows it to be bypassed in the event that the protocol is changed. When in debug mode the mesh function may report to the application layer whether it would have caused a packet to be retransmitted or actioned. That allows the correct operation of the mesh function to be verified.

As indicated above, the link layer 30 is illustrated in FIG. 3 as being made up of two sections 42. In practice, the link layer for both transmission and reception could be implemented by a single set of hardware and/or software.

The power controller 27 may be capable of switching parts of the device into low power modes independently of others. In one arrangement, some or all of the hardware that implements the application layer can be set into a low power mode whilst the link layer 30 remains fully functional for processing received mesh packets in the manner described above. Importantly, this allows the device to support a mesh network by retransmitting selected received packets without enabling the application layer, or indeed any layers above the link layer.

It may be possible for the mesh function to retransmit all mesh messages that it receives, or all mesh messages that have a TTL field that has not reached the limit. This could improve the performance of the network, and might save power at the device by reducing processing, even though it might undertake more transmissions. In designing a device architecture for serving a mesh network these and other considerations should be balanced. In some situations a beneficial result can be reached by having the protocol provide that devices may filter received datagrams and only transmit those datagrams that meet certain criteria, as discussed above, but by configuring the devices so they can perform that filtering at a level that does not require the entirety of the protocol processing hardware of the device to operate at full power.

The protocol in FIG. 3 illustrates an example of applying the invention to a Bluetooth protocol stack. The device may be capable of using that same stack to receive regular BTLE datagrams using the layer 30 as the BTLE link layer for those datagrams. If another protocol were used, the mesh function 43 could be implemented at one or both of the layer 1 and layer 2 portions of the stack. The mesh protocol processing functions performed in unit 43 extend beyond layer 1 and/or layer 2 network functions. For example, they include determining whether to retransmit a packet in order to implement a mesh protocol and determining whether to location action a packet. Functions of a mesh protocol that extend above layer 1 and/or layer 2 can advantageously be implemented in a common power domain with the lowest level of logical protocol processing functions (e.g. all layer 1 and/or layer 2 processing functions) for packets other than mesh packets. For example, unit 43 is in a common power domain with unit 42, which can process conventional BTLE packets. This has the advantage that when the device is listening for either mesh packets or BTLE packets, that domain can be powered on and operational whilst the processing functions for higher layers are in a low power state: that is a state in which they consume less power than when fully operational. Then when a mesh packet arrives, it can be fully protocol processed by the mesh functions without taking higher level entities out of their low power state. In this way the device can serve as a transport for a mesh protocol without consuming excessive energy.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A communication device comprising:
   a first processing circuit configured to process received packets according to a mesh protocol by computing a value of a security function based on a payload of a respective one of the received packets and a stored key of a mesh sub-network of which the communication device is a member;
   a second processing circuit configured to process at least a first one of the received packets at a higher protocol layer than the first processing circuit; and
   a power controller coupled with the first and second processing circuits and configured to place the second processing circuit in a low power state while the first processing circuit remains in an operational state;
   wherein the first processing circuit is configured to retransmit at least a second one of the received packets to another device according to the mesh protocol while the second processing circuit is in the low power state, the retransmitting based at least in part on a match between the computed value of the security function and a Message Authentication Code (MAC) field of the respective packet.

2. The communication device of claim 1, wherein the first processing circuit is configured to demodulate signals representing the received packets.

3. The communication device of claim 1, wherein the first processing circuit is configured to perform error correction and error checking on signals representing the received packets.

4. The communication device of claim 1, wherein the first processing circuit implements a protocol physical layer and a protocol data link layer of the communication device.

5. The communication device of claim 1, wherein the second processing circuit implements a protocol application layer of the communication device.

6. The communication device of claim 1, wherein the first processing circuit resides in a first power domain, the second processing circuit resides in a second power domain, and power consumption of each of the first and second power domains is independently controllable by the power controller.

7. The communication device of claim 1, wherein the first processing circuit comprises hardware logic, and the second processing circuit comprises a processor configured to execute instructions stored in a non-transient memory of the communication device.

8. The communication device of claim 1, wherein the first processing circuit is configured to determine whether each of the received packets comprises a mesh protocol packet.

9. The communication device of claim 1, wherein the first processing circuit is configured to determine whether to pass the first one of the received packets to the second processing circuit for protocol application layer processing based, at least in part, on a mesh network address stored in the communication device.

10. The communication device of claim 9, wherein the first processing circuit is configured to further:
    pass the first one of the received packets to the second processing circuit based on a match between a payload of the first one of the received packets and the mesh network address stored in the communication device.

11. The communication device of claim 1, wherein the first processing circuit is configured to further:
    determine whether a time-to-life (TTL) value of the second one of the received packets is greater than a threshold;
    retransmit the second one of the received packets to the other device if the TTL value is greater than the threshold; and
    update the TLL value of the second one of the received packets.

12. The communication device of claim 1, wherein the first processing circuit is configured to retransmit the second one of the received packets to the other device based on a power reserve of the communication device.

13. The communication device of claim 1, the first processing circuit configured to operate in a first mode and a second mode, wherein:
    when operating in the first mode, the first processing circuit is to retransmit the received packets to the other device in accordance with the mesh protocol; and
    when operating in the second mode, the first processing circuit is to pass the received packets to the second processing circuit.

14. The communication device of claim 1, wherein the first processing circuit is configured to pass received packets not associated with the mesh protocol to the second processing circuit.

15. The communication device of claim 1, wherein the first processing circuit is to retransmit the second one of the received packets to the other device by:
    determining whether the second one of the received packets matches a list of previously received packets; and retransmitting the second one of the received packets if there is not a match with the list of previously received packets.

16. A method for processing packets received by a communication device, the method comprising:

processing the received packets according to a mesh protocol using a first processing circuit of the communication device by computing a value of a security function based on a payload of a respective one of the received packets and a stored key of a mesh sub-network of which the communication device is a member;

processing at least a first one of the received packets at a higher protocol layer than the first processing circuit using a second processing circuit of the communication device;

placing the second processing circuit in a low power state while the first processing circuit remains in an operational state; and retransmitting at least a second one of the received packets to another device according to the mesh protocol using the first processing circuit while the second processing circuit is in the low power state, the retransmitting based at least in part on a match between the computed value of the security function and a Message Authentication Code (MAC) field of the respective packet.

17. The method of claim 16, wherein the first processing circuit implements a protocol physical layer and a protocol data link layer of the communication device, and the second processing circuit implements a protocol application layer of the communication device.

18. The method of claim 16, wherein the retransmitting comprises:

retransmitting the second one of the received packets to the other device based on a power reserve of the communication device.

* * * * *